(12) United States Patent
Chen

(10) Patent No.: US 6,389,920 B1
(45) Date of Patent: May 21, 2002

(54) MECHANISM FOR EASY AND PRECISE CONTROL OF GEAR SHIFTING DEVICE OF BICYCLE

(75) Inventor: Chieh-Yuan Chen, Taichung (TW)

(73) Assignee: AD_II Engineering Inc., Taichung (TW)

( * ) Notice: Subject to any disclaimer, the term of this patent is extended or adjusted under 35 U.S.C. 154(b) by 0 days.

(21) Appl. No.: 09/265,564

(22) Filed: Mar. 9, 1999

(51) Int. Cl.⁷ .............................................. B62K 23/04
(52) U.S. Cl. ............................. 74/475; 74/489; 74/506; 74/527
(58) Field of Search ................................ 74/489, 502.2, 74/527, 473.14, 473.26, 506, 473.13, 473.3

(56) References Cited

U.S. PATENT DOCUMENTS

| | | | | |
|---|---|---|---|---|
| 4,325,267 A | * | 4/1982 | Kojima | |
| 4,840,081 A | * | 6/1989 | Nagano | |
| 5,197,927 A | * | 3/1993 | Patterson et al. | |
| 5,476,019 A | * | 12/1995 | Cheever et al. | |
| 5,662,000 A | * | 9/1997 | Patterson et al. | |
| 5,676,020 A | * | 10/1997 | Jordan et al. | |
| 5,845,537 A | * | 12/1998 | Campagnolo | 74/473.28 |
| 5,988,008 A | * | 11/1999 | Rau | 74/473.1 |
| 6,021,688 A | * | 2/2000 | Chang | 74/502.2 |

* cited by examiner

Primary Examiner—Richard M. Lorence
Assistant Examiner—Saúl J. Rodríguez
(74) Attorney, Agent, or Firm—Browdy and Neimark

(57) ABSTRACT

A control mechanism of a bicycle gearshifting device is composed essentially of a body set provided with a hollow cylindrical portion over which a cable-locating wheel set and a rotator set are fitted. The cable-locating wheel set is provided with a fastening seat for fastening the cable head of a gearshifting cable, and a control arcuate segment for disposing the elastomer. The rotator set is provided with an arcuate protrusion for actuating the cable-locating wheel set to turn at the time when the bicycle handlebar is rotated, thereby activating the gearshifting cable and a derailleur of the bicycle.

21 Claims, 6 Drawing Sheets

MECHANISM FOR EASY AND PRECISE CONTROL OF GEAR SHIFTING DEVICE OF BICYCLE

FIELD OF THE INVENTION

The present invention relates generally to a bicycle gear shifting device, and more particularly to a mechanism for controlling the operation of the bicycle gear shifting device with ease and precision.

BACKGROUND OF THE INVENTION

The conventional gear shifting mechanism on a bicycle is generally attained by a lever which is mounted on the handlebar and is connected with a gearshifting cable for actuating the derailleur. As the lever is triggered, the derailleur is actuated via the gearshifting cable to bring about the gear shifting operation. The cases in point include the U.S. Pat. No. 4,325,267 "BICYCLE CONTROL LEVER DEVICE HAVING CONTROL LEVEL MOVEMENT CONFORMING TO A CYCLIST'S FINGERS", and the U.S. Pat. No. 4,840,081 "SPEED-CHANGE OPERATING LEVER FOR A BICYCLE". Such conventional gear shifting mechanisms as referred to above are not entirely effective in design in that the handlebar must be temporarily let go by the fingers of a bicyclist at the time when the bicyclist desires to activate the gear shifting mechanism. Such an operational maneuver as described above makes the bicyclist vulnerable to traffic accident.

The U.S. Pat. No. 5,197,927 "BICYCLE CONTROL LEVER DEVICE HAVING CONTROL LEVER" discloses an improvement on the bicycle gear shifting mechanism comprising a support seat which is mounted on the bicycle handlebar for fastening and locating the gearshifting cable. As the rotator is rotated, the gearshifting cable is wound by a camlike motion. The gear shifting operation is finally attained by a U-shaped elastic piece, which is retained in the arcuate grooves that are located in the support seat at various angles. Further improvements by the same inventor are disclosed in the U.S. Pat. Nos. 5,476,019 and 5,676,020. However, the gearshifting functions of these improvements on the mechanisms are seriously undermined by an additional friction force which is resulted from the complicated wirework of the mechanisms.

The U.S. Pat. No. 5,662,000 "DETENT SPRING FOR ROTATABLE GRIP ACTUATING SYSTEM" discloses a C-shaped elastic piece of a steel material, which is used in place of the U-shaped elastic piece of a plastic material to attain the gear shifting operation. However, the teeth of the arcuate grooves are vulnerable to wear, especially at the time of the return stroke of the support seat. As a result of the excessive force of the return stroke of the support seat, an unwanted gear shifting operation may be brought about at the time when the bicycle is subjected to a violent vibration on a bumpy road. In addition, the noise and the abnormal wear of the chain and the multisprocket are often resulted from the variation in the stroke even if the elastic piece is already retained by the teeth of the arcate grooves. This deficiency is due to the fact that the head of the gearshifting cable of the conventional gearshifting mechanism is fastened with the rotator.

SUMMARY OF THE INVENTION

It is the primary objective of the present invention to provide a mechanism for controlling the bicycle gearshifting device in such a manner that the elastic piece is located by the teeth of the arcate grooves with precision for an easy to-and-fro stroke operation, thereby resulting in reduction in wear of the component parts.

It is another objective of the present invention to provide a control mechanism of the bicycle gearshifting device with an independent cablelocating wheel set to enable the gearshifting cable to be installed and replaced easily.

The control mechanism of the present invention comprises a body set, an independent cable locating wheel set, and a rotator set.

The body set is provided at the center of the seat thereof with a hollow cylindrical portion, and a connection seat extending from the other peripheral edge of the seat. A gearshifting cable is put into the connection seat such that the gearshifting cable is connected at one end thereof with a derailleur. The seat is provided in the inner edge thereof with a plurality of locating portions. The independent cable locating wheel set is of a circular body, which is fitted over the hollow cylindrical portion of the body set and is provided in one side of the periphery thereof with a gearshifting cable head fastening seat, a curved block, and a curved elastomer of a thin platelike body and having an action portion which can be inserted into each of the locating portions of the body set.

The rotator set is provided with an arcuate protrusion extending from one end thereof such that the arcate protrusion is disposed in the control arcuate segment of the cable locating wheel set. The rotator set is provided at other end thereof with a hollow cylindrical portion which is engaged with the hollow cylindrical portion of the body set.

The foregoing objectives, features, functions, and advantages of the present invention will be more readily understood upon a thoughtful deliberation of the following detailed description of the present invention with reference to the accompanying drawings.

DETAILED DESCRIPTION OF THE INVENTION

Figure 1:
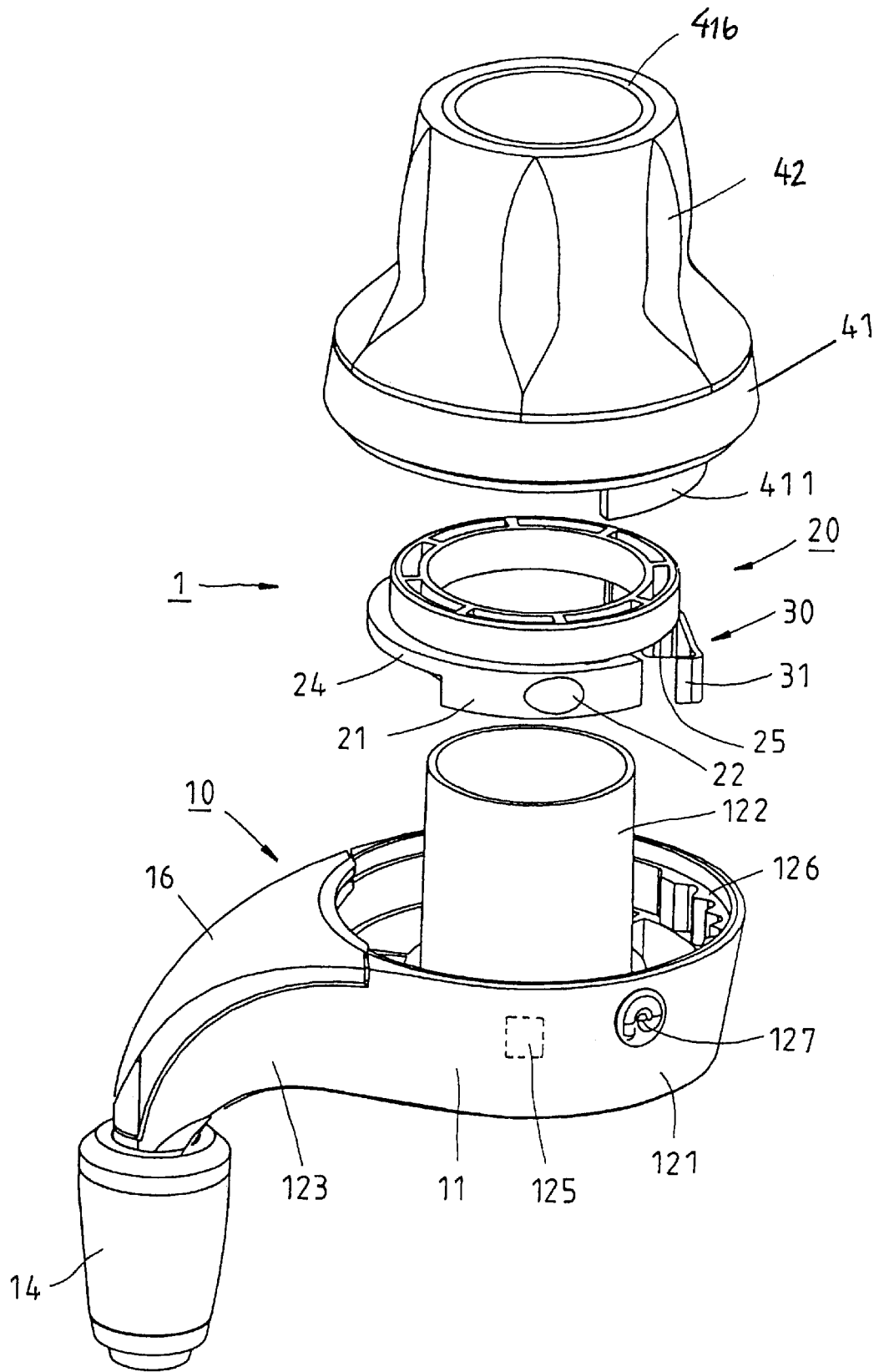
FIG. 1 shows an exploded view of the present invention.
Figure 2:
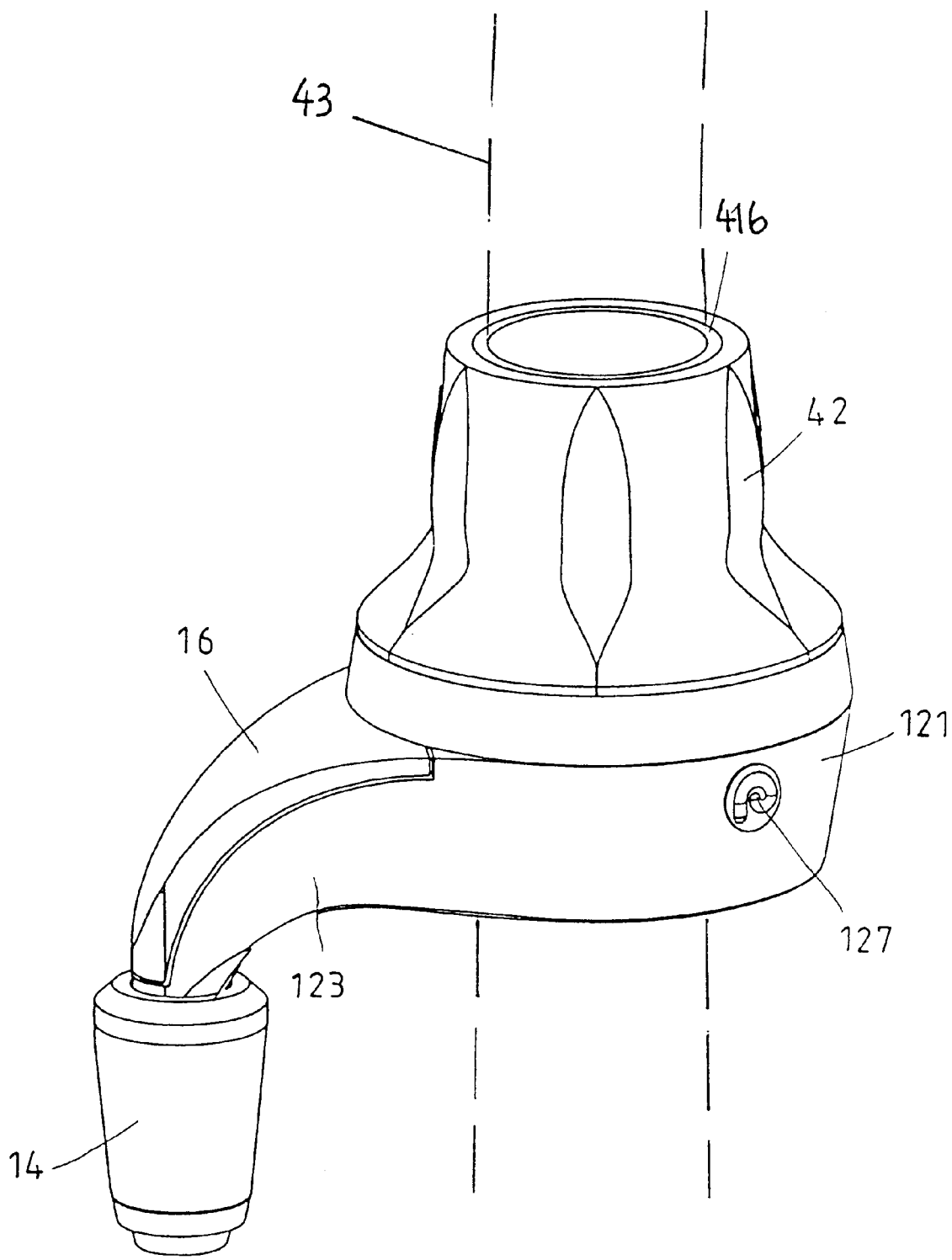
FIG. 2 shows a perspective view of the present invention in combination.

As shown in FIGS. 1 and 2, a control mechanism 1 of the bicycle gearshifting device comprises a body set 10, an independent cable-locating wheel set 20, and a rotator set 30.

The body set 10 comprises a base seat 11 having a seat body 121 which is provided with a hollow cylindrical portion 122 and a curved connection portion 123 which is in turn provided at one end thereof with a straight rod portion 124. The seat body 121 is provided in the inner edge thereof with a protruded block 125 contiguous to the connection portion 123, and a plurality of locating portions 126 which are of a toothed construction and opposite in location to one end of the connection portion 123. Located between the protruded block 123 and the locating portions 126 is a through hole 127. The straight rod portion 124 is fitted into a fitting body 14. The connection portion 122 is provided at the open end thereof with a waterproof and dustproof cover 16.

Figure 3:
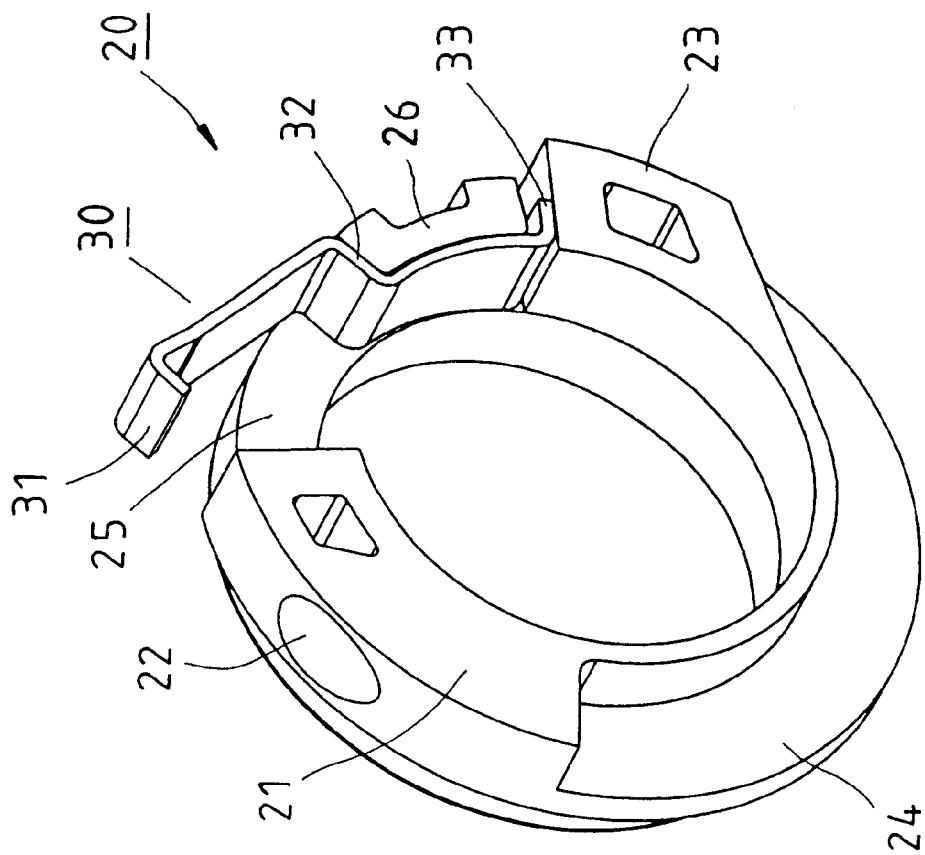
FIG. 3 shows a perspective view of the cable locating wheel set of the present invention.
Figure 4:
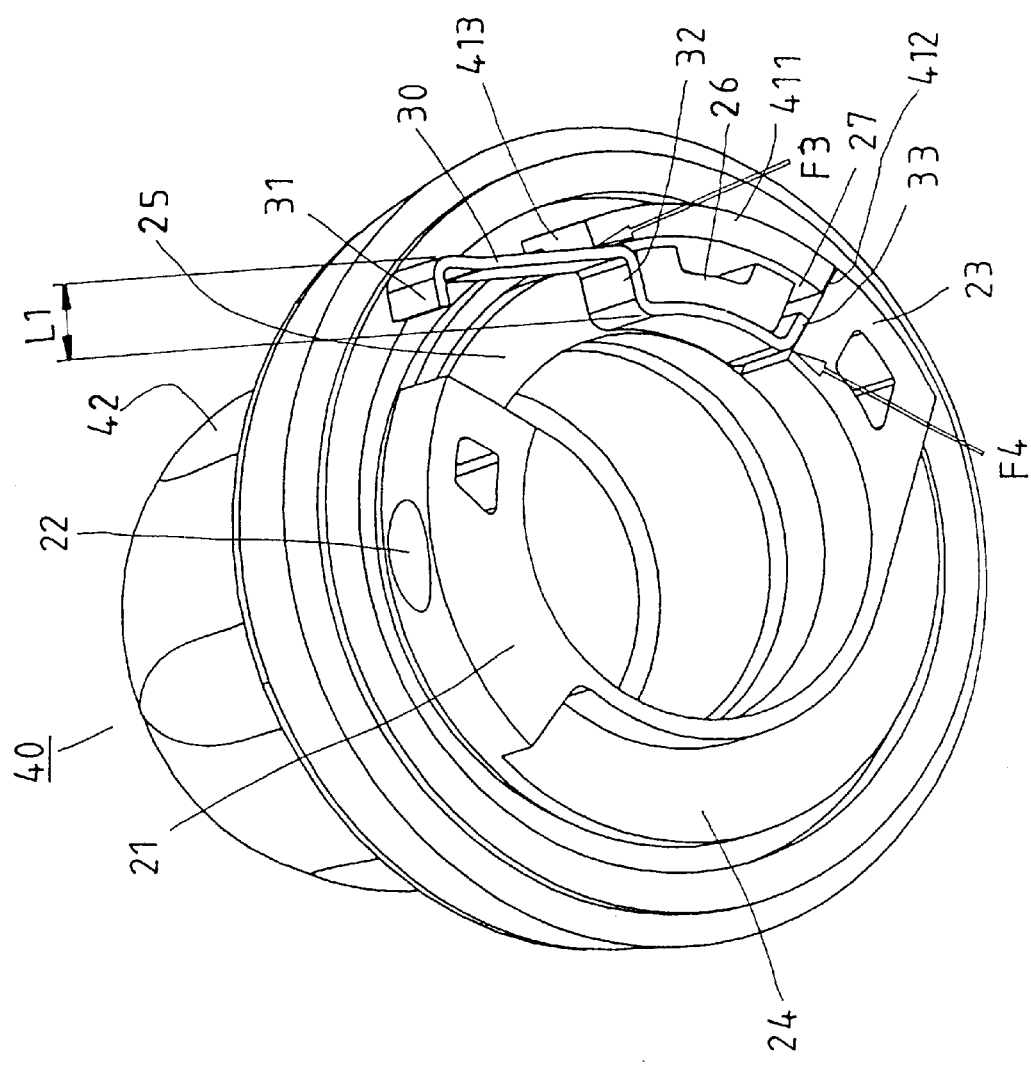
FIG. 4 shows a schematic view of the body set and the cable locating wheel set of the present invention.
Figure 5:
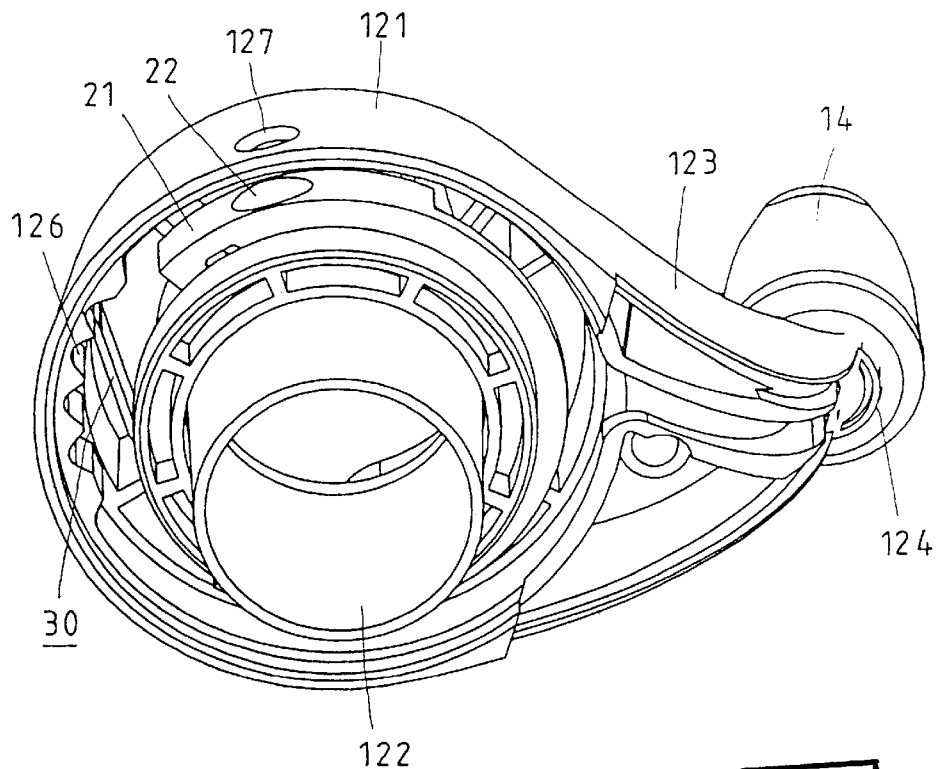
FIG. 5 shows a schematic view of the rotator set and the cable locating wheel set of the present invention.

The cable locating wheel set 20 is of a hollow circular construction and is fitted over the cylindrical portion 122 of the body set 10, as shown in FIGS. 3 and 4. The wheel set 20 is provided in one side thereof with a cable head fastening seat 21 which is in turn provided with a pivoting hole 22 having two segments, a curved block 23, a slot 24 and a control arcuate segment 25 which are located between the fastening seat 21 and the curved block 23. The control arcuate segment 25 is provided with an arresting portion 26 contiguous to the curved block 23, and a retaining slot 27. A curved elastomer 30 is retained in the control arcuate segment 25 of the wheel set 20 such that a first action portion 31 of the elastomer 30 urges the portion between the locating portions 17, and that a second action portion 32 urges the arresting portion 26 of the wheel set 20, and further that a third action portion 33 of the elastomer 30 is retained in the retaining slot 27 of the wheel set 20.

The rotator set 40 comprises a base 41 which is provided at one end thereof with an arcuate protrusion 411, which is engaged with the control arcuate segment 25 of the wheel set 20 such that the wheel set 20 is actuated to turn. The base 41 is further provided at other end thereof with a hollow cylindrical portion 416 which is mounted on the handlebar in conjunction with the hollow cylindrical portion 122 of the body 10. A grip jacket 42 of a plastic or rubber material is fitted over the hollow cylindrical portion 416 to serve as a hand grip to facilitate the controlling of the rotator set 40.

Figure 6:
FIG. 6 shows a schematic view of the body set, the cable locating wheel set, and the gearshifting cable of the present invention.
Figure 6:
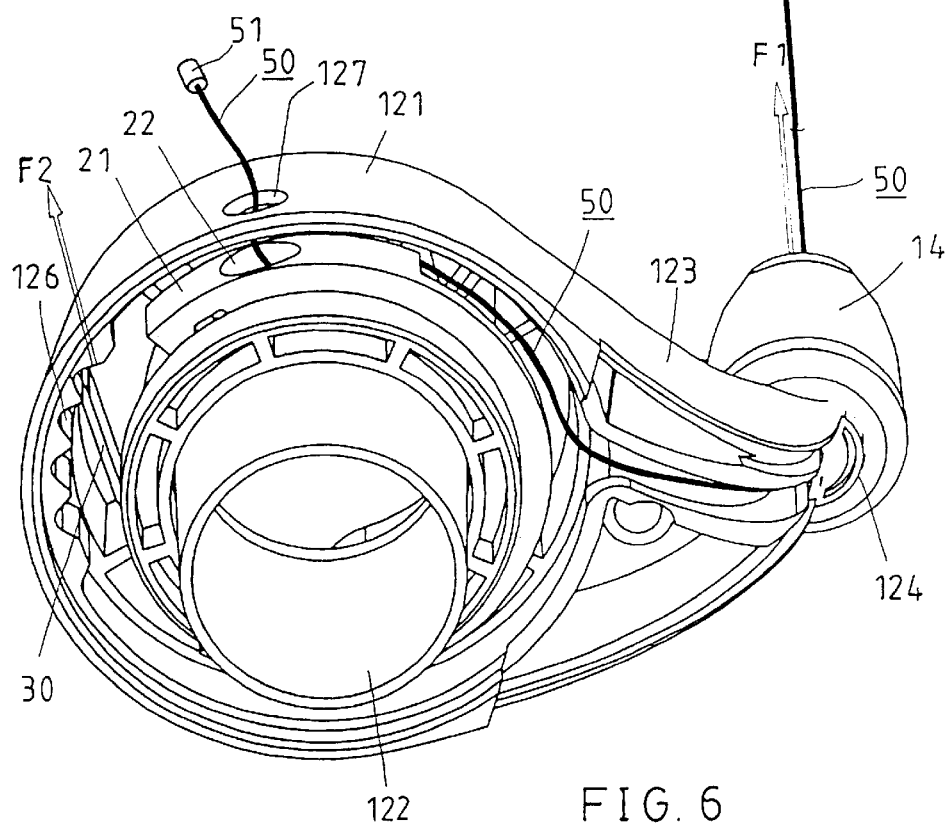

The control mechanism 1 of the present invention is mounted on bicycle handlebar 43 by the cylindrical portion 122 of the base seat 12 and the cylindrical portion 416 of the base 41. When the gearshifting cable 50 (See FIG. 6) is put through the control mechanism 1, one end (opposite to the fastening head 51) of the cable 50 is put through the pivoting hole 22 of the fastening seat 21 of the wheel set 20 via the through hole 127 of the seat body 121 of the base seat 12. The end of the cable 50 is then put out of the straight rod portion 124 before being connected with the rear wheel derailleur 45.

In operation, when the rotator set 40 is turned an angle, the arcuate protrusion 411 is caused to displaced such that one side 412 of the arcuate protrusion 411 urges the curved block 23 of the wheel set 20 so as to actuate the wheel set 20 to turn in reverse. As a result, the cable head 51 of the gearshifting cable 50 is actuated by the cable head fastening seat 21 in motion, thereby resulting in the gearshifting operation brought about by the derailleur 45. When the wheel set 20 is turned, the arcuate protrusion 411 is caused to move away from the control arcuate segment 25 of the wheel set 20. As a result, the action portion 31 of the elastomer 30 is relieved of the pressure such that the action portion 31 is jutted out of the control arcuate segment 25 to urge any one of the locating portions 126 of the body set 10 so as to secure firmly the gearshifting state. The displacement distance of the cable 50 actuated by the rotational angle of the wheel set 20 is the optimum design of the shifting of the sprocket chain. In light of the action portion 31 being located in the locating portions 126, the action portion 31 is located securely by the component force F2 which is brought about by the elastic force F1 of the gearshifting device (not shown in the drawings) toward the locating portions 126. As a result, no accidental gearshifting will take place at the time when the bicycle frame is impacted violently. In addition, the over stroke is averted at the time when the bicycle is subjected to a violent vibration on a bumpy road, thanks to the elastomer 30 which is disposed on the independent cable-locating wheel set 20.

When the rotator set 40 is turned in reverse to allow the rear gearshifting device to return to its original position, the first action portion 31 of the elastomer 30 is urged by another side 413 of the arcuate protrusion 411 to retract such that the head portion of the elastomer 30 is lower than the locating portion 126. As the rotator set 40 is turned an angle, the action portion 31 is shifted from one of the locating portions 126 to another one of the locating portions 126, thanks to the elastic force of the elastomer 30 and the recovery force of the rear gearshifting device. When the arcate protrusion 411 of the rotator set 40 is moved away from one side of the curved block 23, a force is needed to move the spring toward another locating portion. The force is brought about by the torgue T which is in turn brought about by L1 and the F component force imparted from the operational force of the bicyclist. As a result, the wear of the component parts of the present invention is reduced substantially to prolong the service life span of the present invention and the operational force will be smaller if L1 is bigger.

Figure 7:
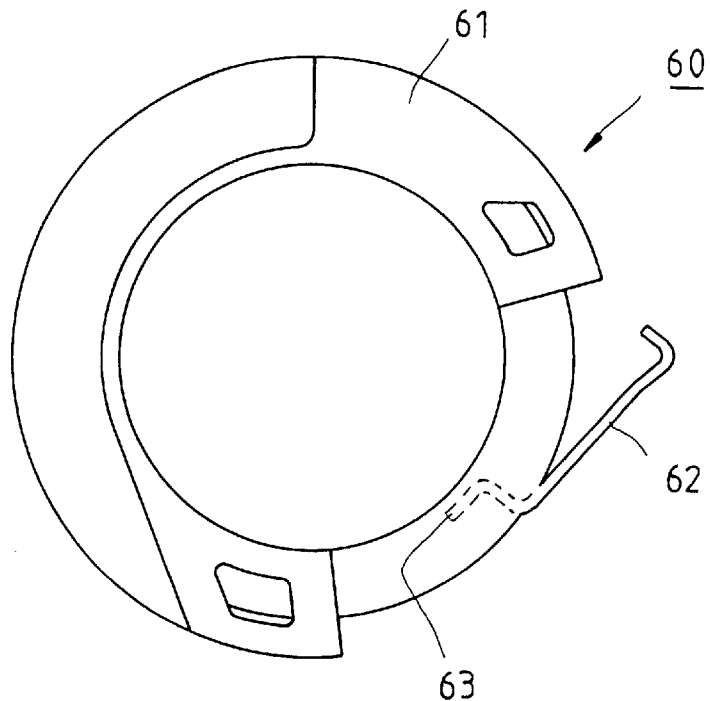
FIG. 7 shows a schematic view of the cable locating wheel set of another embodiment of the present invention.

As shown in FIG. 7, an elastomer 62 of the independent cable-locating wheel set 60 of another embodiment of the present invention is provided with an action portion 63 which is made integrally with a rotary disk 61 by injection molding. Such a modification can serve to attain the similar functions described above.

Figure 8:
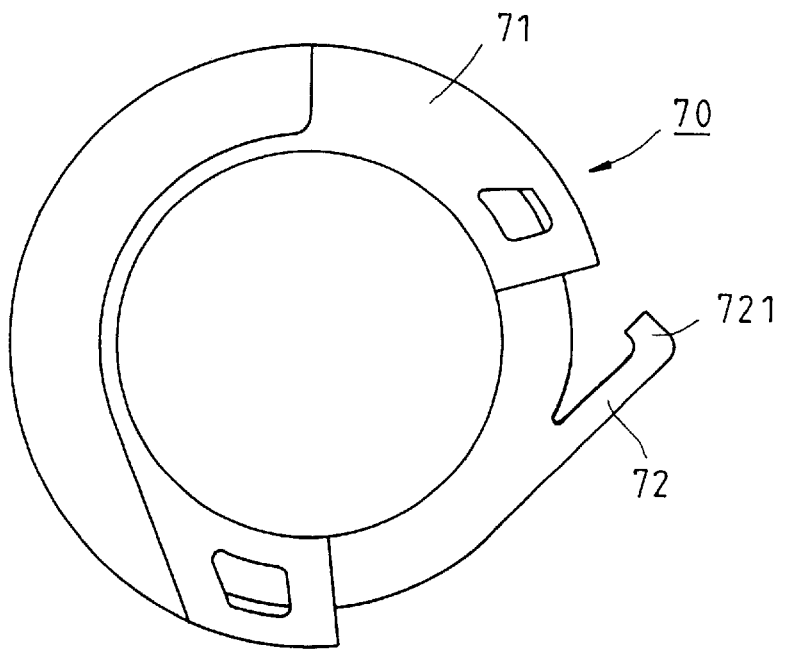
FIG. 8 shows a schematic view of the cable locating wheel set of still another embodiment of the present invention.

As shown in FIG. 8, an elastomer 72 of the independent cable-locating wheel set 70 of still another embodiment of the present invention is made integrally with a rotary disk 71 by injection molding such that the action portion 721 of the top end of the elastomer 72 is capable of urging the locating portion 126 of the base seat 12.

The gearshifting cable 50 of the control mechanism 1 of the present invention can be easily installed by fastening the cable head 51 with the fastening seat 22 of the independent cable-locating wheel set 20 such that the cable 50 is pulled out of the straight rod portion 124 of the body 10 via the slot 24. The cable can be released easily and rapidly, thanks to the elastomer 30 which is disposed in the control arcuate segment 25 of the wheel set 20. The first action portion 31 of the elastomer 30 is located in the locating portion 126 of the body 10 for enhancing the locating effect of the present invention.

The embodiments of the present invention described above are to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A control mechanism of a bicycle gearshifting device, said control mechanism comprising:

a body set having a seat body provided at the center thereof with a hollow cylindrical portion, said seat body further provided in an outer periphery thereof with a connection seat into which a gearshifting cable is disposed such that one end of said gearshifting cable is adapted to be connected with a derailleur, said seat body further provided in an inner edge thereof with a plurality of locating portions;

an independent cable-locating wheel set of a circular body and fitted over said hollow cylindrical portion of said body set, said wheel set provided in one side thereof with a gearshifting cable head fastening seat, a curved block, and a curved elastomer, said cable head fastening seat intended for fastening said cable head, said elastomer provided with an action portion corresponding in location to and engageable with said location portions of said body set, a rotator set provided at one end thereof with an arcuate protrusion, and at other end thereof with a hollow cylindrical portion which is engaged with said hollow cylindrical portion and adapted to be mounted on a bicycle handlebar; and wherein said wheel set is provided with a control arcuate segment; and wherein said body set is provided with a protruded block contiguous to said connection seat and corresponding in location to said control arcuate segment for confining the rotational angle of said wheel set.

2. The control mechanism as defined in claim 1, wherein said cable head fastening seat of said wheel set is provided with a pivoting hole of various diameters for disposing said cable head.

3. The control mechanism as defined in claim 1, wherein said wheel set is provided with a slot located between said cable head fastening seat and said curved block for disposing said gearshifting cable.

4. The control mechanism as defined in claim 1, wherein said elastomer is disposed in said control arcuate segment, said control arcuate segment provided with an arresting portion contiguous to said curved block, and a retaining slot, said elastomer provided with a first action portion, a second action portion urging said arresting portion, and a third action portion retained in said retaining slot, thereby enabling said first action portion of said elastomer to be extracted from or retracted into said control arcuate segment.

5. The control mechanism as defined in claim 1, wherein said elastomer of said wheel set has one end which is opposite in location to said action portion and is fastened with a rotary disk.

6. The control mechanism as defined in claim 5, wherein said elastomer of said wheel set and said rotary disk are made integrally by injection molding.

7. A control mechanism of a bicycle gearshifting device, said control mechanism comprising:

a body set having a seat body provided at the center thereof with a hollow cylindrical portion, said seat body further provided in an outer periphery thereof with a connection seat into which a gearshifting cable is disposed such that one end of said gearshifting cable is adapted to be connected with a derailleur, said seat body further provided in an inner edge thereof with a plurality of locating portions;

an independent cable-locating wheel set of a circular body and fitted over said hollow cylindrical portion of said body set, said wheel set provided in one side thereof with a gearshifting cable head fastening seat, a curved block, and a curved elastomer, said cable head fastening seat intended for fastening said cable head, said elastomer provided with an action portion corresponding in location to and engageable with said location portions of said body set, a rotator set provided at one end thereof with an arcuate protrusion, and at other end thereof with a hollow cylindrical portion which is engaged with said hollow cylindrical portion and adapted to be mounted on a bicycle handlebar; and wherein said set is provided with a slot located between said cable head fastening set and said curved block for disposing said gearshifting cable.

8. The control mechanism as defined in claim 7, wherein said wheel set is provided with a control arcuate segment; and wherein said body set is provided with a protruded block contiguous to said connection seat and corresponding in location to said control arcuate segment for confining the rotational angle of said wheel set.

9. The control mechanism as defined in claim 7, wherein said cable head fastening seat of said wheel set is provided with a pivoting hole of various diameter for disposing said cable head.

10. The control mechanism as defined in claim 7, wherein a elastomer is disposed in a control arcuate segment, said control arcuate segment provided with an arresting portion contiguous to said curved block, and a retaining slot, said elastomer provided with a first action portion, a second action portion urging said arresting portion, and a third action portion retained in said retaining slot, thereby enabling said first action portion of said elastomer to be extracted from or retracted into said control arcuate segment.

11. The mechanism as defined in claim 7, wherein said elastomer of said wheel set has one end which is opposite in location to said action portion and is fastened with a rotary disk; and wherein said elastomer of said wheel set and said rotary disk are made integrally by injection molding.

12. A control mechanism of a bicycle gearshifting device, said control mechanism comprising:

a body set having a seat body provided at the center thereof with a hollow cylindrical portion, said seat body further provided in an outer periphery thereof with a connection seat into which a gearshifting cable is disposed such that one end of said gearshifting cable is adapted to be connected with a derailleur, said seat body further provided in an inner edge thereof with a plurality of locating portions;

an independent cable-locating wheel set of a circular body and fitted over said hollow cylindrical portion of said body set, said wheel set provided in one side thereof with a gearshifting cable head fastening seat, a curved block, and a curved elastomer, said cable head fastening seat intended for fastening said cable head, said elastomer provided with an action portion corresponding in location to and engageable with said location portions of said body set, a rotator set provided at one end thereof with an arcuate protrusion, and at other end thereof with a hollow cylindrical portion which is engaged with said hollow cylindrical portion and adapted to be mounted on a bicycle handlebar; and wherein an elastomer is disposed in a control arcuate segment, said control arcuate segment provided with an arresting portion contiguous to said curved block, and a retaining slot, said elastomer provided with a first action portion, a second action portion urging said arresting portion, and a third action portion retained in said retaining slot, thereby enabling said first action portion of said elastomer to be extracted from or retracted into said control arcuate segment.

13. The control mechanism as defined in claim 12, wherein said wheel set is provided with a control arcuate segment; and wherein said body set is provided with a protruded block contiguous to said connection seat and corresponding in location to said control arcuate segment for confining the rotational angle of said wheel set.

14. The control mechanism as defined i n claim 12, wherein said cable head fastening seat of said wheel set is provided with a pivoting hole of various diameter for disposing said cable head.

15. The control mechanism as defined in claim 12, wherein said set is provided with a slot located between said cable head fastening set and said curved block for disposing said gearshifting cable.

16. The mechanism as defined in claim 12, wherein said elastomer of said wheel set has one end which is opposite in location to said action portion and is fastened with a rotary disk; and wherein said elastomer of said wheel set and said rotary disk are made integrally by injection molding.

17. A control mechanism of a bicycle gearshifting device, said control mechanism comprising:

a body set having a seat body provided at the center thereof with a hollow cylindrical portion, said seat body further provided in an outer periphery thereof with a connection seat into which a gearshifting cable is disposed such that one end of said gearshifting cable is adapted to be connected with a derailleur, said seat body further provided in an inner edge thereof with a plurality of locating portions;

an independent cable-locating wheel set of a circular body and fitted over said hollow cylindrical portion of said body set, said wheel set provided in one side thereof with a gearshifting cable head fastening seat, a curved block, and a carved elastomer, said cable head fastening seat intended for fastening said cable head, said elastomer provided with an action portion corresponding in location to and engageable with said location portions of said body set, a rotator set provided at one end thereof with an arcuate protrusion, and at other end thereof with a hollow cylindrical portion which is engaged with said hollow cylindrical portion and adapted to be mounted on a bicycle handlebar;

wherein said elastomer of said wheel set has one end which is opposite in location to said action portion and is fastened with a rotary disk; and wherein said elastomer of said wheel set and said rotary disk are made integrally by injection molding.

18. The control mechanism as defined in claim 17, wherein said wheel set is provided with a control arcuate segment; and wherein said body set is provided with a protruded block contiguous to said connection seat and corresponding in location to said control arcuate segment for confining the rotational angle of said wheel set.

19. The control mechanism as defined in claim 17, wherein said cable head fastening seat of said wheel set is provided with a pivoting hole of various diameter for disposing said cable head.

20. The control mechanism as defined in claim 17, wherein said set is provided with a slot located between said cable head fastening set and said curved block for disposing said gearshifting cable.

21. The control mechanism as defined in claim 17, wherein a elastomer is disposed in a control arcuate segment, said control arcuate segment provided with an arresting portion contiguous to said curved block, and a retaining slot, said elastomer provided with a first action portion, a second action portion urging said arresting portion, and a third action portion retained in said retaining slot, thereby enabling said first action portion of said elastomer to be extracted from or retracted into said control arcuate segment.

* * * * *